(12) United States Patent
Sone

(10) Patent No.: US 6,628,436 B1
(45) Date of Patent: Sep. 30, 2003

(54) IMAGE SCANNING APPARATUS

(75) Inventor: Toshihiro Sone, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 653 days.

(21) Appl. No.: 09/587,277

(22) Filed: Jun. 5, 2000

(51) Int. Cl.⁷ .................................................. H04N 1/46
(52) U.S. Cl. ...................... 358/505; 358/447; 358/532; 358/504; 341/155; 341/144
(58) Field of Search ................. 358/447, 532, 358/504, 505; 341/155, 144

(56) References Cited

U.S. PATENT DOCUMENTS 4,827,352 A * 5/1989 Yoneda et al. .............. 358/287
5,680,477 A * 10/1997 Asada .......................... 382/169
6,160,634 A * 12/2000 Terashita ..................... 358/1.9

FOREIGN PATENT DOCUMENTS

| JP | 8-101015 | 4/1996 |
| JP | 11-258477 | 9/1999 |

* cited by examiner

*Primary Examiner*—Edward Coles
*Assistant Examiner*—Heather D Gibbs
(74) *Attorney, Agent, or Firm*—Foley & Lardner

(57) ABSTRACT

The invention is adapted to output readings from the image board within a scanner to an operating panel. This allows the adjustment of the optical axis of the scanner to be made independently while confirming the displayed output values. Thereby, in an apparatus for scanning an original document using CCD line sensors, the adjustment of the reading optical axis of the CCD line sensors can be made without using any special equipment.

17 Claims, 5 Drawing Sheets

FIG. 8
TILTED OPTICAL AXIS
```
AJ MODE
Ave  R: F F E E D D B A 9 7
Ave  G: B C D E F F E D C A
Ave  B: A B C C D D E E F F  ~91a
```
FIG. 9
DISPLACED OPTICAL AXIS
```
AJ MODE
Ave  R: A B B A A A A 9 9 A
Ave  G: C C C C D C C C D D
Ave  B: F E E F F E E F F F  ~91b
```
FIG. 10
ALIGNED OPTICAL AXIS
```
AJ MODE                     ~91c
Ave  R: E E D E F D E E D E
Ave  G: F E E F F E E F F F
Ave  B: E E D E E D E D E D
```
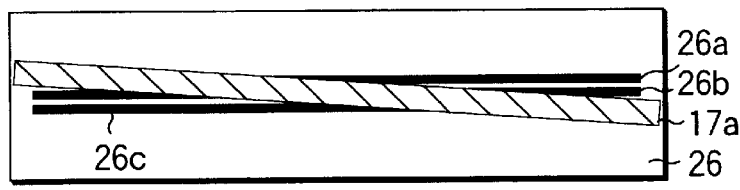
FIG. 11
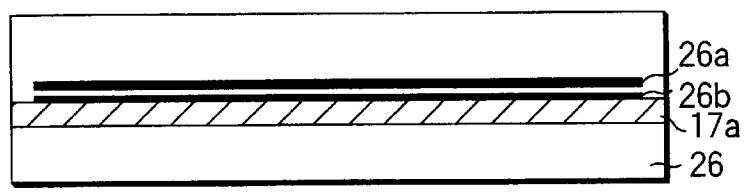
FIG. 12
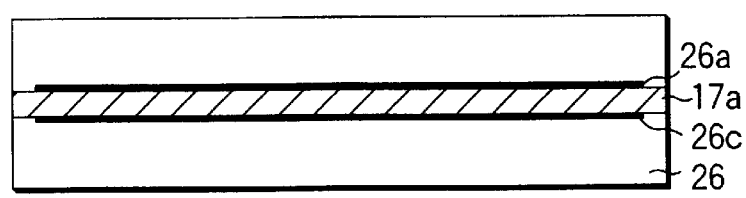
FIG. 13

IMAGE SCANNING APPARATUS

BACKGROUND OF THE INVENTION

The present invention relates to an image scanning apparatus, such as a scanner, for scanning an image on an original document by directing light from a light source onto the original document, passing reflected light from the document through an optical system, such as mirrors and so on, and allowing the document image to be captured by three CCD line sensors of R (red), G (green) and B (blue).

In recent years, image scanning apparatuses, such as scanners, for scanning an image on an original document by directing light from a light source onto the original document, passing reflected light from the document through an optical system, such as mirrors and so on, and allowing the document image to be captured by three CCD line sensors of R (red), G (green) and B (blue) have been put into practical use.

In this case, light from the light source is directed onto the original document image and the reflected light from the original document image is led to the CCD line sensors through multiple mirrors.

In such scanners, it is required to adjust the optical axes at apparatus assembly time or when, as a result of reading a half-tone image, irregularities in density and color occur over the entire surface of the read image.

For example, when density differences occur on leading and trailing edge sides of the read image or density differences occur on front and rear sides in the main scan direction, the optical axis of light from the light source directed onto each CCD line sensor is adjusted.

The optical axes to the CCD line sensors are adjusted by changing (adjusting) the angles of the mirrors used to lead reflected light to the CCD line sensors.

At the time of optical axis adjustment, an optical axis adjustment jig having a white line in the main scan direction is placed above the light source, an oscilloscope for displaying signals (voltage signals) from the CCD line sensors is connected to signal output lines of the CCD line sensors, and a dedicated control panel is connected to a CPU bus.

Using the oscilloscope, the deviation of the output of each of the CCD line sensors (red/green/blue) is corrected. The signal (voltage signal) of each CCD line sensor can be taken in only from the front of AMP. For this reason, the output signal must be confirmed with a lens cover for preventing stray light, destruction of a board and dust removed and the probe of the oscilloscope attached to the output signal (voltage signal) pin of each CCD line sensor.

The voltage signals of the CCD line sensors of red, green and blue are taken into the oscilloscope prior to entering AMP to display the amount of voltage in each of the CCD line sensors. The angle of each mirror is then adjusted with a corresponding screw so that a peak voltage value appears in the CCD line sensor of green in the center of the CCD line sensors.

At this point, the scanners must be operated for each unit; thus, a dedicated control panel is needed. The adjustment is made for each scanner. The input signals to the oscilloscope are output from the CCD line sensors in the form of changes in voltage. The output signal (voltage signal) of each of the CCD line sensors (red/green/blue) is converted into HEX data in 256 levels and used as an image processing signal. Thus, the qualitative evaluation of adjustment cannot be performed because the output signal (voltage signal) of each CCD line sensor and the signal subjected to image processing (HEX data in 256 levels) differ. As a whole, even if irregularities in density are eliminated in each unit, the density varies from unit to unit because of failure in numerical management of units.

All the work is carried out manually, spending a lot of time.

In principle, the adjustments are made by a service man using an oscilloscope. Thus, the quality of images depends on the skill of service men, providing poor serviceability.

BRIEF SUMMARY OF THE INVENTION

It is an object of the present invention to provide an image scanning apparatus which scans an original document image using CCD line sensors and permits the optical axis in the CCD line sensors to be adjusted without using any special equipment.

It is another object of the present invention to provide an image scanning apparatus which scans an original document image using CCD line sensors and can adjust the optical axis automatically on an apparatus basis without using any equipment, permits field adjustments and adjustments at assembly time to be made easily, and can increase the time efficiency, improve the workability, and reduce the cost.

It is still another object of the present invention to provide an image scanning apparatus which scans an original document image using CCD line sensors and can digitize the output levels of the CCD line sensors, can perform level management for each apparatus, and can suppress variations from apparatus to apparatus.

It is a further object of the present invention to provide an image scanning apparatus which scans an original document image using CCD line sensors and can grasp output values of the CCD line sensors for each color, can grasp the color levels of a read image, and can adjust the optical axis without using any special equipment.

To attain the objects there is provided an image scanning apparatus comprising: a light source for emitting light; reflecting means for reflecting an image produced by irradiating an optical axis adjust member having a white line with the light from the light source; first conversion means for converting into pixel signals each based on the density of a corresponding one of color components of the image reflected by the reflecting means; second conversion means for converting into density signals each based on the average density over every two or more pixels in a corresponding one of the pixel signals; and display means for displaying values based on the density converted by the second conversion means for every two or more pixels for each color component.

According to the present invention there is provided an image scanning apparatus comprising: a light source for emitting light; reflecting means for reflecting an image produced by irradiating an optical axis adjust member having a white line with the light from the light source; first conversion means for converting into pixel signals each based on the density of a corresponding one of color components of the image reflected by the reflecting means; second conversion means for converting into density signals each based on the average density over every two or more pixels in a corresponding one of the pixel signals converted by the first conversion means; display means for displaying values based on the density converted by the second conversion means for every two or more pixels for each color component; and adjust means for adjusting the direction of reflection by the reflecting means on the basis of the display on the display means so that an image based on the white line is positioned in the center of the first conversion means.

According to the present invention there is provided an image scanning apparatus comprising: a light source for emitting light; a mirror for reflecting an image produced by irradiating an optical axis adjust member having a white line with the light from the light source; three CCD line sensors for converting into pixel signals each based on the density of a corresponding one of color components of the image reflected by the mirror; conversion means for converting into density signals each based on the average density over every two or more pixels in a corresponding one of the pixel signals converted by the three CCD line sensors; display means for displaying values based on the density converted by the conversion means for every two or more pixels for each color component; and adjust means for adjusting the inclination and of the direction of reflection by the reflecting means on the basis of the display on the display means so that an image based on the white line is positioned in the center of and in parallel with the three CCD line sensors.

BRIEF DESCRIPTION OF THE SEVERAL VIEWS OF THE DRAWING

FIGS. 8, 9 and 10 show examples of display screens of the liquid crystal display unit at the time of optical axis adjustment; and FIGS. 11, 12 and 13 are diagrams for use in explanation of the conditions of the optical axis on the basis of the relative position of a white line and each CCD line sensor.

DETAILED DESCRIPTION OF THE INVENTION

Hereinafter, the embodiment of the present invention will be described with reference to the accompanying drawings.

Figure 1:
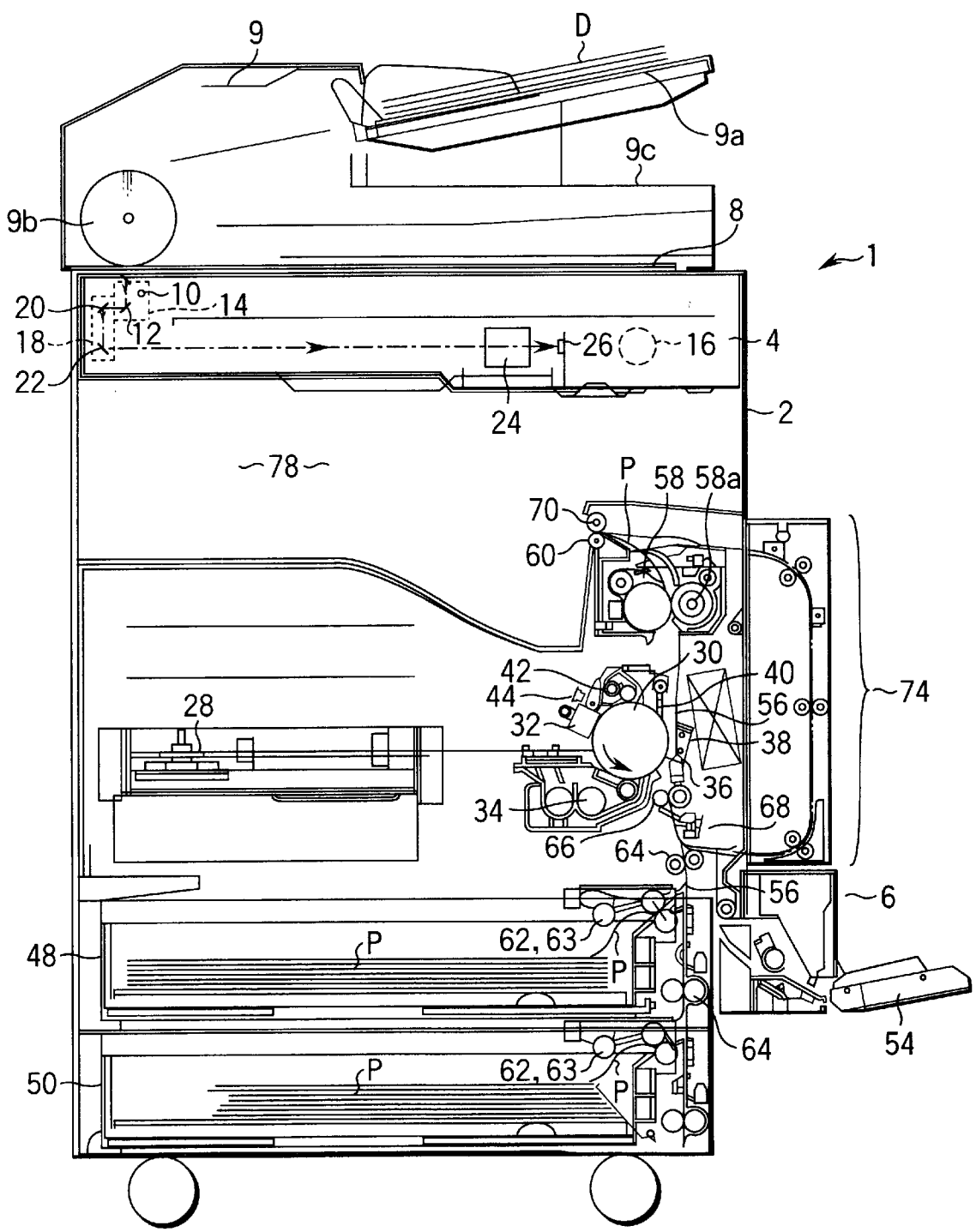
FIG. 1 is a sectional view of a digital copying machine having a scanner as an example of an image scanning apparatus of the present invention.

FIG. 1 is a sectional view of a digital copying machine 1 having a scanner as an example of an image scanning apparatus of the present invention.

As shown in FIG. 1, the digital copying machine 1 has a body 2 in which a scanner 4 as an image scanning apparatus and a printer 6 serving as image formation means are provided.

On the top of the apparatus body 2 is provided a board 8, consisting of transparent glass, on which an object to be scanned, i.e., an original document D, is placed. Further, on the top of the apparatus body 2 is placed an automatic original document feed device 9 (hereinafter referred to as ADF: Auto Document Feeder) as a feed means for automatically feeding the document D to the original document board 8.

The original document D placed on the document tray 9a of the ADF 9 is carried through a platen roller 9b to an exit tray 9c by a carry guide not shown. While being carried by the platen roller 9b, the document D is exposure scanned by an exposure lamp 10 in the scanner to be described later, whereby the image of the document D is scanned.

The documents D are set on the document tray 9a of the ADF 9 with their reading surface up and are taken in one at a time beginning with the uppermost one.

The scanner provided in the apparatus body 2 has an exposure lamp 10, such as a halogen lamp, that illuminates a document D carried by the ADF 9 or placed on the document board 8 and a first mirror 12 for deflecting reflected light from the document D in a given direction, the exposure lamp 10 and the first mirror 12 being mounted to a first carriage 14 provided below the document tray 8.

The first carriage 14 is arranged to be movable parallel to the document board 8 and moved in two ways below the document tray 8 by a scanner motor (drive motor) 16 through a teethed belt not shown. The scanner motor 16 consists of a stepping motor or the like.

Below the document board 8 is provided a second carriage 18 movable parallel to the board 8. To the second carriage 18 second and third mirrors 20 and 22 are mounted at right angles to each other to deflect the reflected light from the document D deflected by the first mirror in sequence. The second carriage 18 receives torque from the scanner motor 16 through the teethed belt driving the first carriage 14 and, while following the first carriage 14, moves at half the speed of the first carriage 14 parallel to the document board 8.

Below the document board 8 are provided an imaging lens 24 that focuses the reflected light from the third mirror 20 on the second carriage 18 and a CCD sensor 26 composed of three CCD line sensors 26a, 26b and 26c which subject the reflected light focused by the imaging lens 24 to photoelectric conversion. The imaging lens 24 is arranged to be movable through a driving mechanism in a plane containing the optical axis of the light deflected by the third mirror 22 and images the reflected light at a desired magnification (main scanning direction) by its movement. The CCD line sensors 26a, 26b and 26c perform photoelectric conversion on incident reflected light in accordance with an image processing clock from a main CPU to be described later and output electrical signals corresponding to the read document D. The magnification in the sub-scanning direction can be set by changing the carrying speed by the ADF 9 or the travel speed of the first carriage 14.

The light from the exposure lamp falls on each of the CCD line sensors 26a, 26b and 26c. The difference in the read timing is compensated for by succeeding circuitry.

In reading a document D carried by the ADF 9, the illumination position of the exposure lamp 10 is fixed at the position shown in FIG. 1. In reading a document D placed on the document board 8, the illumination position of the exposure lamp 10 is moved from left to right along the document board 8.

Figure 2:
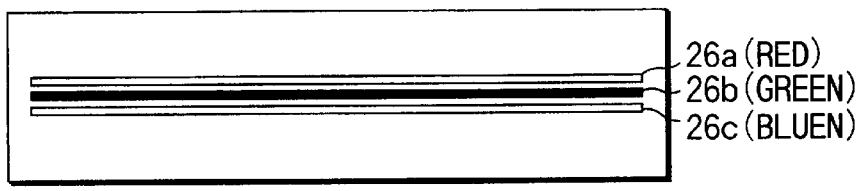
FIG. 2 shows the arrangement of CCD line sensors.
Figure 3:
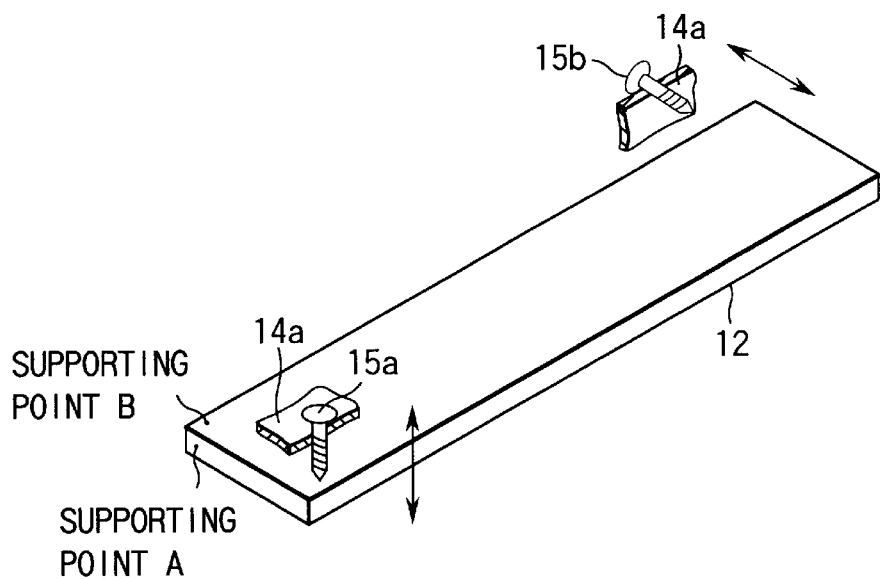
FIG. 3 is a diagram for use in explanation of a adjust screw and an inclination adjust screw provided in the vicinity of the first mirror.

The three CCD line sensors 26a, 26b and 26c are arranged in sequence from the top and adapted for red, green and blue, respectively, as shown in FIG. 2. For example, the CCD line sensors 26a, 26b and 26c each consist of 7200 pixels.

Read processing is performed taking into consideration the difference in the read timing among the CCD line sensors 26a, 26b and 26c.

In the vicinity of the first mirror 12 are provided an adjust screw 15a and an inclination adjust screw 15b. The tip of the adjust screw 15a is positioned at one of the four corners of the first mirror 12. Rotating the adjust screw 15a causes the first mirror 12 to rotate with respect to supporting point A, thereby allowing the optical axis of scanning line deflected by the first mirror 12 to move up and down. For example, rotating the adjust screw 15a right causes the position of the optical axis on the CCD sensor 26 to move upward and rotating the adjust screw 15a left causes the position of the optical axis on the CCD sensor 26 to move downward.

The tip of the inclination adjust screw 15b is positioned at one of the four corners of the first mirror 12. Rotating the inclination adjust screw 15b causes the first mirror 12 to rotate with respect to supporting point B, thereby allowing the inclination of the optical axis of scanning line deflected by the first mirror 12 to be changed.

The adjust screw 15a and the inclination adjust screw 15b are mounted to chassis 14a of the first carriage 14.

Figure 4:
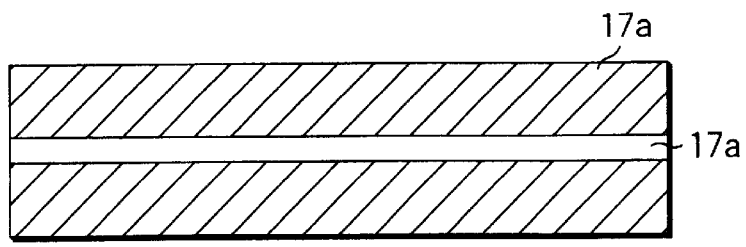
FIG. 4 is a diagram for use in explanation of an optical axis adjust jig.

Such an optical axis adjust jig 17 as shown in FIG. 4 is attached to the first carriage 14 at the time of optical axis adjustment. As shown in FIG. 4, the optical axis adjust jig 17 has a white straight line 17a in the center of it with other portions blacked. The white line 17a extends in the same direction as the direction of the main scanning by the CCD line sensors 26a, 26b and 26c. The white line 17a forms a chart of the optical axis adjust jig 17, for example, a chart in which a white straight line is drawn on a black sheet of paper.

Figure 5:
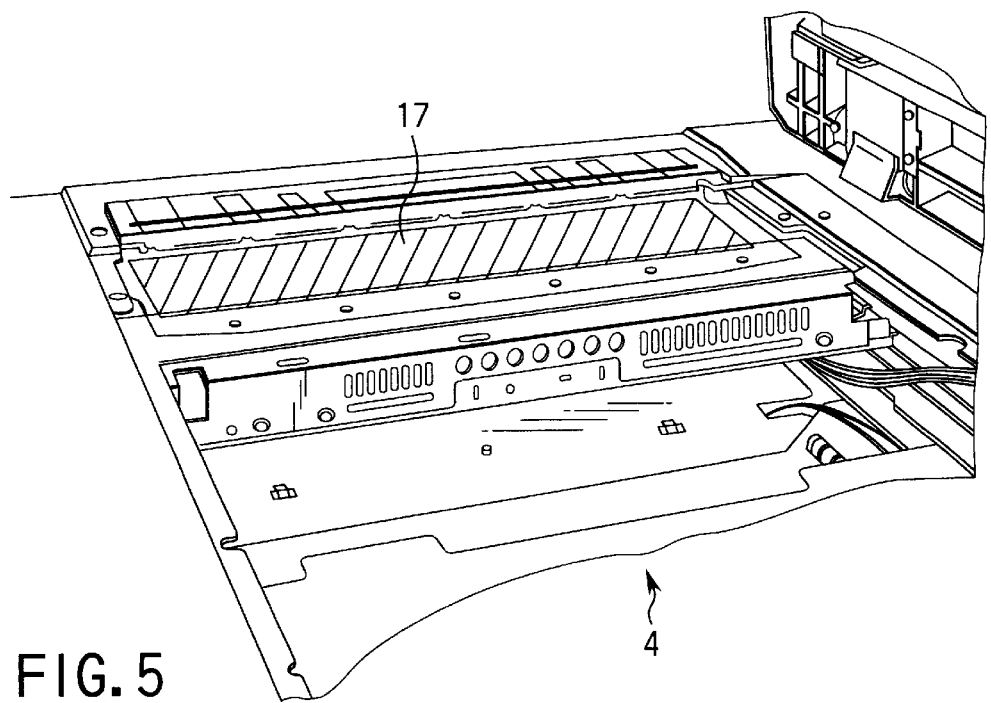
FIG. 5 is a diagram for use in explanation of the attached state of the optical axis adjust jig.

At the time of optical axis adjustment in a state where the document board 8 is removed, as shown in FIG. 5, the optical axis adjust jig 17 is attached or placed to or on the top of the first carriage 14 with the white line side down.

On the other hand, the printer 6 is equipped with a laser exposure device 28 acting as latent image formation means. Scanning of the peripheral surface of a photosensitive drum 30 with laser light from the laser exposure device 28 allows an electrostatic latent image to be formed on the peripheral surface of the photosensitive drum 30.

In addition, the printer 6 has the photosensitive drum 30 as an image bearing body placed on the right-hand side of the center of the apparatus body 2. The peripheral surface of the photosensitive drum 30 is exposed to laser light from the laser exposure device 28 to form a desired electrostatic latent image.

Around the photosensitive drum 30 are arranged an electric charger 32 for charging the peripheral surface of the drum, a developer 34 as developing means for developing the latent image formed on the photosensitive drum 30 with a desired density by supplying tonor as developing power, a separation charger 36 for separating an image formed medium fed from a cassette 48 or 50 to be described later, i.e., copy paper P, from the photosensitive drum 30, a transfer charger 38 for transferring the tonor image formed on the photosensitive drum 30 onto the paper P, a release claw 40 for releasing the copy paper P from the peripheral surface of the photosensitive drum 30, a cleaning device 42 for cleaning tonor left on the peripheral surface of the photosensitive drum 30, and a charge remover 44 for removing charge on the peripheral surface of the photosensitive drum 30.

In the lower portion of the apparatus body 2 are provided an upper cassette 48 and a lower cassette 50 which can be drawn out of the body. Each of the cassettes 48 and 50 is loaded with copy paper of different size. A hand supply tray 54 is provided at the side of the upper cassette 48.

In the apparatus body 2 is formed a paper feed path 56 that extends from the cassettes 48 and 50 through the transfer section located between the photosensitive drum 30 and the transfer charger 38. A fixation device 58 having a fixation lamp 58a is provided at the end of the paper feed path 56. An exit port 70 is formed above the fixation device 58.

In the vicinity of each of the cassettes 48 and 50 are provided a supply roller 62 and a separation roller 63 for taking paper P one at a time out of the corresponding cassette. A number of paper feed roller pairs 64 for feeding the paper P taken out by the feed roller 62 and the separation roller 63 is provided along a paper feed path 56.

In the paper feed path 56 a regist roller pair 66 is provided upstream of the photosensitive drum 30. The regist roller pair 66 corrects the tilt of the copy paper P taken out, brings the leading edge of the tonor image on the photosensitive drum 30 and the leading edge of the copy paper P in registration with each other, and feeds the copy paper P to the transfer section at the same speed as the peripheral surface of the photosensitive drum 30 travels. A sensor 68 for detecting arrival of the copy paper P is provided ahead of the regist roller pair 66, i.e., on the side of the feed rollers 64.

Copy paper taken out of the cassette 48 or 50 one at a time by the feed rollers 62 is fed to the regist roller pair 66 by means of the feed roller pair 64. The copy paper P has its leading edge registered by the regist roller pair 66 and is then fed to the transfer section.

In the transfer section, the developed image formed on the photosensitive drum 30, i.e., the tonor image, is transferred onto paper P by means of the transfer charger 38. The tonor image transferred copy paper P is released from the peripheral surface of the photosensitive drum 30 by the action of the separation charger 36 and the release claw 40 and then carried to the fixation device 58 through a carry belt (not shown) that forms part of the feed path 56. The developed image is fused and fixed to the copy paper P by the fixation device 58 and the copy paper P is then ejected to a receiving tray 72 in the apparatus body 2 through the exit port 60 by a discharge roller pair 70.

To the right of the feed path 56 is provided an automatic both-side device 74 which reverses the copy paper P passed through the fixation device 58 and then sends it again to the feed path 56.

The above-described digital copying machine 1 may be used either as a standalone unit or as a network printer.

In the latter case, the digital copying machine 1 is attached to personal computers (PCs) or a server (not shown) by a local area network (LAN) (not shown).

Figure 6:
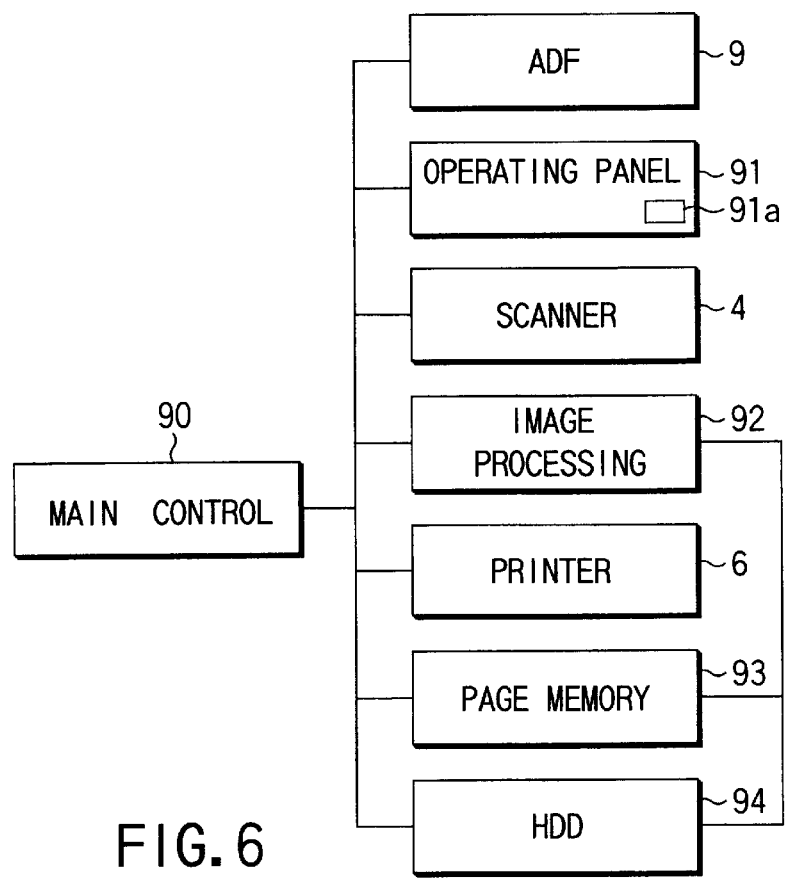
FIG. 6 is a block diagram of a control circuit in the digital copying machine.

The internal arrangement of the control circuit of the digital copying machine 1 will be described with reference to FIG. 6.

The digital copying machine 1 has a main control unit 90 that controls the whole. Though not shown, the main control unit 90 comprises a CPU (central processing unit) for controlling the operation, a ROM (rend only memory) stored with software for the operation of the digital copying machine 1, and a RAM (random access memory) (S-RAM) temporarily stored with image data and other data concerning operations.

The main control unit 90 is connected with the ADF 9, the scanner 4, the printer 6, an operating panel 91, an image processing unit 92, a page memory 93 and an HDD 84 by a bus 95.

The operating panel 91 is provided in the upper portion of the front of the apparatus body 2. The operating panel 91 is used to set up various copying conditions, such as a copy magnification, etc., and instruct the initiation of copying and has ten keys used in setting the number of copies.

The operating panel 91 is provided with a liquid crystal display (LCD) 91a that provides operational guidance and has on-screen touch keys for entering various commands.

When the power is turned on while the keys "0" and "5" of the ten keys are being depressed, the main control unit 90 recognizes the optical axis adjustment mode, displays "AJMODO" on the liquid crystal display 91a, and outputs control signals for the optical axis adjustment mode to the SCN-CPU 100 in the scanner 4.

The image processing unit 92 is adapted to process a document image scanned by the scanner 4, process image data from the page memory 93 or the HDD 94, and output the processed image data to the page memory 93, the printer 6, or the HDD 94.

The image processing unit 92 has a compression/expansion circuit not shown and compresses image data from the page memory 93 or expands image data from the HDD 94 using this compression/expansion circuit.

The page memory 93 is adapted to store image data from the image processing unit 92.

The HDD 94 is an external storage device, typically a hard disk on which various pieces of data are stored. For example, in copying multiple documents, the read images are stored with compression and, at print time, the compressed images are read and printed.

The main control unit 91 has input tasks and print tasks which are managed on a job basis.

Figure 7:
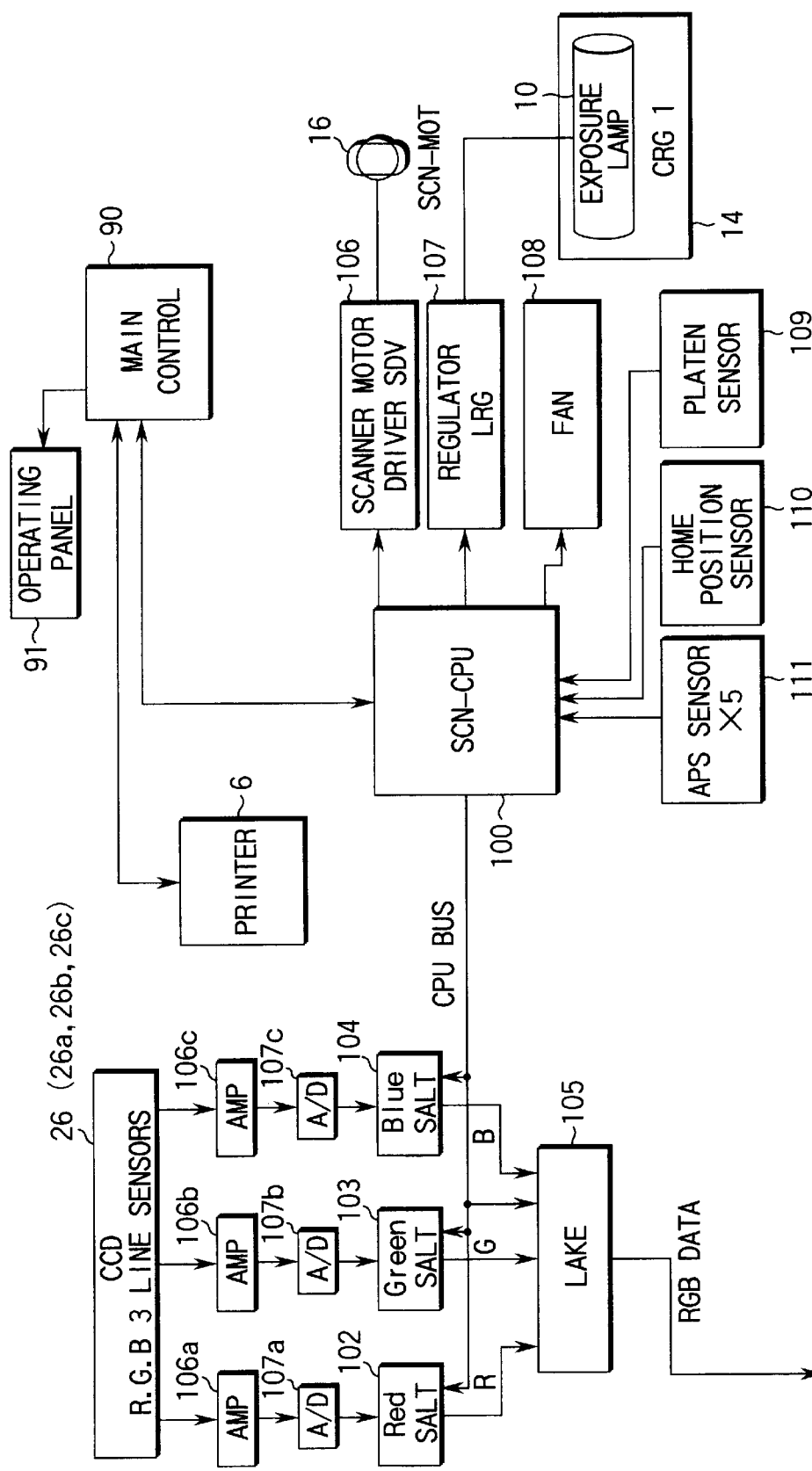
FIG. 7 is a block diagram of the scanner.

Next, the arrangement of the scanner 4 will be described with reference to FIG. 7.

That is, there is provided SCN-CPU 100 as a control unit for controlling the entire scanner 4. The SCN-CPU 100 is connected to the main control unit 90.

To the SCN-CPU 100 are connected by a CPU bus 101 a red signal processing unit (SALT) 102, a green signal processing unit (SALT) 103, a blue signal processing unit (SALT) 104, and an operations processing unit (LAKE) 105.

The red signal processing unit 102 is supplied with a signal obtained by amplifying an output signal of the CCD line sensor 26a in an amplifier 106a and converting the amplified signal into a digital signal in an A/D converter 107a. The red signal processing unit 102 is adapted to output a red signal (R) on a pixel basis obtained by subjecting the red digital signal from the A/D converter 107a to processing, such as signal detection, level adjustment, mixing ratio adjustment, etc. The red signal (R) is output to the operations processing unit 105 and the SCN-CPU 100.

The green signal processing unit 103 is supplied with a signal obtained by amplifying an output signal of the CCD line sensor 26b in an amplifier 106b and converting the amplified signal into a digital signal in an A/D converter 107b. The green signal processing unit 103 is adapted to output a green signal (G) on a pixel basis obtained by subjecting the red digital signal from the A/D converter 107b to processing, such as signal detection, level adjustment, mixing ratio adjustment, etc. The green signal (G) is output to the operations processing unit 105 and the SCN-CPU 100.

The blue signal processing unit 104 is supplied with a signal obtained by amplifying an output signal of the CCD line sensor 26c in an amplifier 106c and converting the amplified signal into a digital signal in an A/D converter 107c. The blue signal processing unit 104 is adapted to output a blue signal (B) on a pixel basis obtained by subjecting the blue digital signal from the A/D converter 107c to processing, such as signal detection, level adjustment, mixing ratio adjustment, etc. The blue signal (B) is output to the operations processing unit 105 and the SCN-CPU 100.

The operations processing unit 105 is adapted to carry out operations processing, such as white balancing, gamma correction, etc., on the color signals (R, G, B) on a pixel basis from the red signal processing unit 102, the green signal processing unit 103, and the blue signal processing unit 104. The resultant color signals (R, G, B) are output to the image processing unit 92.

The SCN-CPU 100 outputs the average density when 7200 pixels of each of the CCD line sensors 26a, 26b and 26c is equally divided by 10 into sets of 720 pixels to the main control unit 90 for each color signal (R, G, B). The average density is output to the main control unit 90 as one of 16 levels into which 256 levels of density data are divided, that is, a hexadecimal HEX value (0 to F).

As a reference at adjustment time, the display of the average over a width of 30 mm is optimum because irregularities in the image plane can be grasped every 30 mm in width in the main scanning direction. In scanning an A3-size document, since the document is about 300 mm in the main scanning direction, the apparatus is set to make 10-division display.

As described above, the average over 720 pixels of data which are one tenth of 7200 pixels is set as one piece of data.

The criterion for black identification in image processing (decision of whether an image is a black one or a half-tone one) is such that, when the maximum of the difference between the red/green/blue signals in HEX value (IR−G1 or 1G−B1) is below 16/256 level, the corresponding image is identified as black.

Thus, a line of data is displayed hexadecimally in 16 levels into which 256 levels are divided.

The readings of the chart 17a on the optical axis adjust jig 17 by the CCD line sensors 26a, 26b and 26c become 0/F (HEX value) on the black side (the direction in which the density increases) and F/F (HEX value) on the white side (the direction in which the density decreases).

Thus, when ten hexadecimal digits FFFFF . . . are displayed at optical axis adjust time, it follows that a white straight line 17a is read on black paper. The signals processed by the signal processing units 102, 103 and 104 (voltage signals from the CCD line sensors 26a, 26b and 26c) are converted into hexadecimal data for 256 values. The average of 720 pixels of data in the main scanning direction is calculated and given in hexadecimal.

The readings from the CCD line sensors 26a, 26b and 26c are output to the main control unit 90 and displayed on the operating panel 91.

At this point, the values displayed on the liquid crystal display 91a are the values which are obtained by processing voltage signals from the CCDs by the signal processing units 102, 103 and 104 and output to the image processing unit 92.

The CCD line sensors 26a, 26b and 26c are arranged in the order of red, green and blue as shown in FIG. 2. Since the green line sensor is centered, when the white line 17a on the white line optical axis adjust jig 17 is read, it becomes that red: DDEDE . . . , green: FFFF . . . , and blue: CDEEDC . . .

At adjustment time, the inclination of the first mirror 12 are adjusted so that the readings from the green CCD line sensor 26b become peak.

Thereby, the main control unit 90 displays values from the SCN-CPU 100 when each of the CCD line sensors 26a, 26b and 26c are divided into ten on the liquid crystal display 91a of the operating panel 91 as shown in FIGS. 8, 9 and 10.

For example, when signals from the white line 17a on the optical axis adjust jig 17 are supplied, the results are F or E in correspondence with the maximum reflectance. When signals from black portions at some distance from the white line 17a on the optical axis adjust jig 17 are supplied, the results are D or C. When signals from black portions at some more distance from the white line 17a on the optical axis adjust jig 17 are supplied, the results are B, A or 9.

Thereby, when the optical axis is tilted as shown in FIG. 11, such values as shown in FIG. 8 are displayed on the liquid crystal display 91a. The F or E value appears diagonally, in which case the main control unit 90 can judge that the portion corresponding to the white line 18a crosses at an angle and that the optical axis is tilted.

When the optical axis is displaced horizontally as shown in FIG. 12, such values as shown in FIG. 9 are displayed on the liquid crystal display 91a. The F or E value appears along the CCD line sensor 26c, in which case the main control unit 90 can judge that the portion corresponding to the white line 17a is displaced from the center and that the optical axis is displaced horizontally.

When the optical axis is aligned as shown in FIG. 13, such values as shown in FIG. 10 are displayed on the liquid crystal display 91a. The F or E value appears along the CCD line sensor 26b, in which case the main control unit 90 can judge that the portion corresponding to the white line 17a is centered and that the optical axis is aligned.

To the SCN-CPU 100 are connected a scanner motor driver (SDV) 106 for driving the scanner motor 16, a regulator (LRG) 107 for on-off control of the exposure lamp 10, a cooling fan (FAN) 108, a platen sensor 109 for sensing the presence or absence of a document on the document board 8, a home position sensor 110 for sensing the leading edge of a document on the document board 8, and an automatic paper size (APS) sensor 111 for sensing the size of a document on the document board 8.

Next, in the above arrangement, the optical axis adjustment processing will be described with reference to the displayed contents on the liquid crystal display 91a shown in FIGS. 8, 9 and 10 based on color signals (R, G, B) from the CCD line sensors 26a, 26b and 26c and the illuminated conditions of optical axes La, Lb and Lc on the optical axis adjust jig 17 shown in FIGS. 11, 12 and 13.

That is, the power switch (not shown) is turned on while the keys 0 and 5 on the operating panel 91 are being depressed. Thereby, the main control unit 90 judges the adjust mode and starts the power supply in the adjust mode so that AJMODO (adjust mode) is displayed on the operating panel 91. The optical axis adjust mode in the adjust mode is selected.

At the startup of the adjust mode, the document board 8 is removed and the optical axis adjust jig 17 is mounted or placed on the top of the first carriage 14 with its white line side down as shown in FIG. 5.

Based on the selection of the optical axis adjust mode, the main control unit 90 outputs control signals for the optical axis adjust mode to the SCN-CPU 100.

Thereby, the SCN-CPU 100 controls the scanner motor driver 106 to drive the scanner motor 16, thereby moving the first carriage 14.

When the movement of the first carriage 14 is detected by the home position sensor 110, the SCN-CPU 100 recognizes the movement of the first carriage 14 and controls the regulator 107 to turn the exposure lamp 10 on.

As a result, light from the exposure lamp 10 is directed onto the optical axis adjust jig 17.

The reflected light from the optical axis adjust jig 17 is conducted through the mirrors 12, 20 and 22 and the lens 24 onto the CCD line sensors 26a, 26b and 26c of the CCD sensor 26.

Thereby, the output signal of the CCD line sensor 26a is amplified by the amplifier 106a and then converted into a digital signal by the A/D converter 107a. The red signal processing unit 102 outputs a red signal (R) on a pixel basis after subjecting the red digital signal from the A/D converter 107a to processing, such as signal detection, level adjustment, mixing ratio adjustment, etc. The red signal (R) is output to the SCN-CPU 100.

The output signal of the CCD line sensor 26b is amplified by the amplifier 106b and then converted into a digital signal by the A/D converter 107b. The green signal processing unit 103 outputs a green signal (G) on a pixel basis after subjecting the green digital signal from the A/D converter 107b to processing, such as signal detection, level adjustment, mixing ratio adjustment, etc. The green signal (G) is output to the SCN-CPU 100.

The output signal of the CCD line sensor 26c is amplified by the amplifier 106c and then converted into a digital signal by the A/D converter 107c. The blue signal processing unit 104 outputs a blue signal (B) on a pixel basis after subjecting the blue digital signal from the A/D converter 107c to processing, such as signal detection, level adjustment, mixing ratio adjustment, etc. The blue signal (B) is output to the SCN-CPU 100.

The SCN-CPU 100 then outputs the average densities over every 720 pixels of 7200 pixels of the CCD line sensors 26a, 26b and 26c in hexadecimal values (0 through F) corresponding to 16 ranges into which 256 levels is divided by 16 to the main control unit 90 for each color signal (R, G, B).

Thereby, the main control unit 90 displays the values from the SCN-CPU 100 corresponding to the CCD line sensors 26a, 26b and 26c on the liquid crystal display 91a of the operating panel 91 as shown in FIGS. 8, 9 and 10.

For example, when such values as shown in FIG. 8 are displayed on the liquid crystal display 91a, the F or E values appear on the left-hand side of the CCD line sensor 26a, at the center of the CCD line sensor 26b, and on the right-hand side of the CCD line sensor 26c. It is therefore judged that the portion corresponding to the white line 17a crosses diagonally and the reading optical axis in the main scanning direction is tilted as shown in FIG. 11.

In this case, the values at the leftmost ends of the CCD line sensors 26a, 26b and 26c are F, B, and A. This results in a light orange color because the red component output from the CCD line sensor 26a is large and the blue component output from the CCD line sensor 26c is small.

The values in the vicinity of the center of the CCD line sensors 26a, 26b and 26c are D, F and D, indicating that the green component output from the CCD line sensor 26b is large. This results in a light green color. The values at the rightmost ends of the CCD line sensors 26a, 26b and 26c are 7, A, and F. This results in a light blue color because the blue component output from the CCD line sensor 26c is large.

Thus, even if the white line 17a on the optical axis adjust jig 17 is read, variations occur in the outputs of the CCD line sensors 26a, 26b and 26c because of the displacement of the optical axis.

In this case, the inclination of the optical axis of the scanning line deflected by the first mirror 12 is corrected by moving the inclination adjust screw 15b to rotate the first mirror 12 with respect to the supporting point B.

For example, when such values as shown in FIG. 9 are displayed on the liquid crystal display 91a, the F or E values appear along the CCD line sensor 26c. It is therefore judged that the portion corresponding to the white line 17a is displaced from the center and the reading optical axis in the main scanning direction is displaced as shown in FIG. 12.

In this case, since the peak value of the CCD line sensors 26a, 26b and 26c appears in the blue output of the CCD line sensor 26c, it is judged that the optical axis is displaced overall.

Thus, even if the white line 17a on the optical axis adjust jig 17 is read, a light blue color results because the optical axis is displaced to the side of the blue CCD line sensor 26c.

In this case, even if a monochrome half-tone image is read, a light blue image will result.

This is a phenomenon that takes place when the optical axis is displaced at initial white correction time.

In such an event, adjustment is made by rotating the first mirror 12 with respect to the supporting point A with the adjust screw 15a, whereby the optical axis of the scanning line is moved up or down.

Thus, the surface irregularities in the image can be eliminated by changing the angle of the first mirror 12 at optical axis adjust time so that the white line (chart) 17a of the optical axis adjust jig 17 is read by the green CCD line sensor 26b.

When such values as shown in FIG. 10 are shown on the liquid crystal display 91a, it can be judged that the portion corresponding to the white line 17a is centered and the optical axis is aligned as shown in FIG. 13 because the F or E values appear along the green CCD line sensor 26b.

In this case, it can be judged that each of the CCD line sensors 26a, 26b and 26c reads nearly the white line and the green CCD line sensor 26b reads the center of the line 17a of the optical axis adjust jig 17. In this case, the optimum optical axis is obtained.

Although, in the above embodiment, the adjustment is made with the light source turned on at the start of the movement of the first carriage, this is not restrictive. The light source may be turned on in a state where the first carriage is fixed in its initial position.

As described above, the readings from the image board within the scanner are output to the operating panel, which allows the optical axis adjustment to be made for each scanner while confirming the displayed output values.

In addition, since there is no need of measurement instruments and a dedicated operating panel which were essential in making the optical axis adjustment of scanners, the adjustment in the field and the adjustment at assembly time can be made readily, increasing the time efficiency, improving the workability, and reducing the cost.

Moreover, the CCD output levels based on the reading optical axis can be digitized for each scanner, allowing the level management to be made for each equipment.

Furthermore, variations in equipment can be suppressed because constant outputs can be provided.

In addition, the color level of a scanned image can be grasped because output values from the CCD line sensors can be grasped.

The embodiment has been described in terms of an example in which the SCN-CPU outputs the average density over 720 pixels obtained by dividing 7200 pixels by 10 in hexadecimal values (0 to F) as a result of the division of 256 levels by 16 to the main control unit and the values are displayed on the operating panel. Alternatively, the SCN-CPU may output density data for each pixel (for each of colors: R, G and B) of 7200 pixels through the main control unit to an external personal computer. In this case, the personal computer displays the density data for each color (R, G and B) in detail, allowing the state of the optical axis to be confirmed without outputting any image.

In this case, each of 7200×9600 pixels is displayed in 256 levels of density for each color, which allows the state of the optical axis to be grasped in detail.

What is claimed is:

1. An image scanning apparatus comprising:

a light source for emitting light;

reflecting means for reflecting an image produced by irradiating an optical axis adjust member having a white line with the light from the light source;

first conversion means for converting into pixel signals each based on the density of a corresponding one of color components of the image reflected by the reflecting means;

second conversion means for converting into density signals each based on the average density over every two or more pixels in a corresponding one of the pixel signals; and display means for displaying values based on the density converted by the second conversion means for every two or more pixels for each color component.

2. The image scanning apparatus according to claim 1, wherein the color components of the image converted by the first conversion means are red, green, and blue, and the first converting means is composed of an arrangement of red conversion elements for converting into a pixel signal based on the density of the red component of each pixel in the image, an arrangement of green conversion elements for converting into a pixel signal based on the density of the green component of each pixel in the image, and an arrangement of blue conversion elements for converting into a pixel signal based on the density of the blue component of each pixel in the image.

3. The image scanning apparatus according to claim 2, wherein the three arrangements of conversion elements are provided in parallel with one another.

4. The image scanning apparatus according to claim 1, wherein each pixel signal converted by the first conversion means has 256 levels of density, the second conversion means converts the average density of each pixel signal over every two or more pixels into a density value corresponding to one of 16 hexadecimal values into which the 256 levels of pixel signal are divided, and the display means displays the density value of every two or more pixels for each color component in hexadecimal.

5. The image scanning apparatus according to claim 1, wherein the optical axis adjust jig is a chart on which a white straight line is drawn on a black sheet of paper.

6. An image scanning apparatus comprising:

a light source for emitting light;

reflecting means for reflecting an image produced by irradiating an optical axis adjust member having a white line with the light from the light source;

first conversion means for converting into pixel signals each based on the density of a corresponding one of color components of the image reflected by the reflecting means;

second conversion means for converting into density signals each based on the average density over every two or more pixels in a corresponding one of the pixel signals converted by the first conversion means;

display means for displaying values based on the density converted by the second conversion means for every two or more pixels for each color component; and adjust means for adjusting the direction of reflection by the reflecting means on the basis of the display on the display means so that an image based on the white line is positioned in the center of the first conversion means.

7. The image scanning apparatus according to claim 6, wherein the color components of the image converted by the first conversion means are red, green, and blue, and the first converting means is composed of an arrangement of red conversion elements for converting into a pixel signal based on the density of the red component of each pixel in the image, an arrangement of green conversion elements for converting into a pixel signal based on the density of the green component of each pixel in the image, and an arrangement of blue conversion elements for converting into a pixel signal based on the density of the blue component of each pixel in the image.

8. The image scanning apparatus according to claim 7, wherein the three arrangements of conversion elements are provided in parallel with one another.

9. The image scanning apparatus according to claim 6, wherein each pixel signal converted by the first conversion means has 256 levels of density, the second conversion means converts the average density of each pixel signal over every two or more pixels into a density value corresponding to one of 16 hexadecimal values into which the 256 levels of pixel signal are divided, and the display means displays the density value of every two or more pixels for each color component in hexadecimal.

10. The image scanning apparatus according to claim 6, wherein the optical axis adjust jig is a chart on which a white straight line is drawn on a black sheet of paper.

11. The image scanning apparatus according to claim 6, wherein the adjust means adjusts the direction of reflection by the reflecting means by adjusting the inclination of the reflecting means.

12. An image scanning apparatus comprising:

a light source for emitting light;

a mirror for reflecting an image produced by irradiating an optical axis adjust member having a white line with the light from the light source;

three CCD line sensors for converting into pixel signals each based on the density of a corresponding one of color components of the image reflected by the mirror;

conversion means for converting into density signals each based on the average density over every two or more pixels in a corresponding one of the pixel signals converted by the three CCD line sensors;

display means for displaying values based on the density converted by the conversion means for every two or more pixels for each color component; and adjust means for adjusting the inclination and of the direction of reflection by the reflecting means on the basis of the display on the display means so that an image based on the white line is positioned in the center of and in parallel with the three CCD line sensors.

13. The image scanning apparatus according to claim 12, wherein the color components of the image converted by the first conversion means are red, green, and blue, and the first converting means is composed of an arrangement of red conversion elements for converting into a pixel signal based on the density of the red component of each pixel in the image, an arrangement of green conversion elements for converting into a pixel signal based on the density of the green component of each pixel in the image, and an arrangement of blue conversion elements for converting into a pixel signal based on the density of the blue component of each pixel in the image.

14. The image scanning apparatus according to claim 13, wherein the three arrangements of conversion elements are provided in parallel with one another.

15. The image scanning apparatus according to claim 12, wherein each pixel signal converted by the first conversion means has 256 levels of density, the second conversion means converts the average density of each pixel signal over every two or more pixels into a density value corresponding to one of 16 hexadecimal values into which the 256 levels of pixel signal are divided, and the display means displays the density value of every two or more pixels for each color component in hexadecimal.

16. The image scanning apparatus according to claim 12, wherein the optical axis adjust jig is a chart on which a white straight line is drawn on a black sheet of paper.

17. The image scanning apparatus according to claim 12, wherein the adjust means adjusts the direction of reflection by the reflecting means by adjusting the and inclination of the reflecting means.

* * * * *